(12) United States Patent
Chandrasekaran

(10) Patent No.: US 7,176,662 B2
(45) Date of Patent: Feb. 13, 2007

(54) POWER CONVERTER EMPLOYING A TAPPED INDUCTOR AND INTEGRATED MAGNETICS AND METHOD OF OPERATING THE SAME

(75) Inventor: Sriram Chandrasekaran, Simi Valley, CA (US)

(73) Assignee: ColdWatt, Inc., Austin, TX (US)

( * ) Notice: Subject to any disclaimer, the term of this patent is extended or adjusted under 35 U.S.C. 154(b) by 0 days.

(21) Appl. No.: 11/361,742

(22) Filed: Feb. 23, 2006

(65) Prior Publication Data

US 2006/0197510 A1 Sep. 7, 2006

Related U.S. Application Data

(60) Provisional application No. 60/655,707, filed on Feb. 23, 2005.

(51) Int. Cl.
G05F 1/652 (2006.01)
G05F 1/656 (2006.01)
(52) U.S. Cl. ................ 323/222; 323/282; 323/284; 323/285
(58) Field of Classification Search ........... 323/222, 323/284, 282, 285
See application file for complete search history.

(56) References Cited

U.S. PATENT DOCUMENTS

| | | | | |
|---|---|---|---|---|
| 4,577,268 A | * | 3/1986 | Easter et al. | 363/21.18 |
| 5,336,985 A | * | 8/1994 | McKenzie | 323/266 |
| 5,736,842 A | * | 4/1998 | Jovanovic | 323/222 |
| 5,815,386 A | * | 9/1998 | Gordon | 363/50 |
| 5,886,508 A | * | 3/1999 | Jutras | 323/267 |
| 6,094,038 A | * | 7/2000 | Lethellier | 323/282 |
| 6,489,754 B2 | * | 12/2002 | Blom | 323/222 |
| 6,512,352 B2 | * | 1/2003 | Qian | 323/282 |

* cited by examiner

*Primary Examiner*—Bao Q. Vu
(74) *Attorney, Agent, or Firm*—Slater & Matsil, L.L.P.

(57) ABSTRACT

A power converter employing a tapped inductor and method of operating the same. In one embodiment, the power converter includes first and second tapped inductors including a tapped winding having a first section and a second section with a tap therebetween. The power converter also includes first and second active phase legs including a main switch series-coupled with an input node of the power converter and the first section of the tapped windings of the first and second tapped inductors, respectively. The first and second active phase legs also include an auxiliary switch interposed between the second section of the tapped windings of the first and second tapped inductors, respectively, and an output node of the power converter.

20 Claims, 14 Drawing Sheets

US 7,176,662 B2

POWER CONVERTER EMPLOYING A TAPPED INDUCTOR AND INTEGRATED MAGNETICS AND METHOD OF OPERATING THE SAME

This application claims the benefit of U.S. Provisional Application No. 60/655,707, entitled "Integrated Multi-Phase Tapped Inductor Buck Converter, Integrated Magnetic Device, and Method of Operation," filed on Feb. 23, 2005, which is incorporated herein by reference.

TECHNICAL FIELD

The present invention is directed, in general, to power electronics and, in particular, to power converters using a tapped inductor and integrated magnetics, and methods of operating the same.

BACKGROUND

A switched-mode power converter (also referred to as a "power converter") is an electronic power processing circuit that converts an input voltage waveform into an output voltage waveform. The waveforms are typically, but not necessarily, dc waveforms, controlled by periodically switching power switches or switches coupled to an inductive circuit element. The switches are generally controlled with a conduction period "D" referred to as a "duty cycle." The duty cycle is a ratio represented by the conduction period of a switch to a switching period thereof. Thus, if a switch conducts for half of the switching period, the duty cycle for the power switch would be 0.5 (or 50 percent).

Feedback controllers associated with power converters manage an operation thereof by controlling the conduction period of a switch employed therein. Generally, a feedback controller is coupled to an output of a power converter in a feedback loop configuration (also referred to as a "control loop" or "closed control loop") to regulate an output characteristic of the power converter such as an output voltage. A switched-mode power converter typically receives a dc input voltage $V_{in}$ from a source of electrical power at input nodes thereof and provides a regulated output voltage $V_{out}$ at output nodes thereof to power, for instance, a microprocessor coupled to the output nodes of the power converter.

Switched-mode power converters are key components in many commercial and military systems for the conversion, control and conditioning of electrical power, and often govern performance and size of the end system. Power density, efficiency and reliability are key metrics used to evaluate power converters. Magnetic devices including transformers and inductors used within power converters contribute a significant percentage to the volume and weight and, hence, determine power density, efficiency, and reliability.

An integrated magnetic device (also referred to as "integrated magnetics") provides a technique to combine multiple inductors and/or transformers in a single magnetic core and is specifically amenable to interleaved power converter topologies where the input or output current is shared among multiple inductors. Integrated magnetics offers several advantages such as improved power density and reduced cost due to the elimination of separate magnetic components, reduced switching ripple in inductor currents, and higher efficiency due to reduced magnetic core and copper losses.

For applications where higher currents (typically greater than 50 amps ("A")) are required at low (typically less than 3.3 volts ("V")) to moderate (typically about 12 V) voltages at high efficiency and power density, a two-phase interleaved power converter might be inadequate to meet switching ripple or response time specifications on inductor currents and output voltage. A larger output capacitor can reduce the output ripple voltage, but will increase the volume and weight of the power converter and result in sluggish transient response to dynamic load conditions. Multi-phase, interleaved power converters beyond the present two-phase designs may advantageously be employed for such applications. Utilizing multiple discrete magnetic cores (e.g., E-cores) to implement multi-phase interleaved power converters and simply paralleling multiple power converters, however, increases component count and interconnect losses resulting in poor power density and efficiency.

To meet response time requirements in systems operating with high current and very low bias voltage, such as 1.5 volts or lower, it is often necessary to place a voltage regulator module in the form of a dedicated dc-dc converter in close proximity to the load. In this manner, an accurate supply voltage can be delivered to a sensitive load such as a microprocessor. Many voltage regulator modules in use today are based on a multi-phase buck power converter. In a multi-phase buck power converter, the duty cycle D equals the ratio of the output voltage $V_{out}$ to the input voltage $V_{in}$ thereof. Microprocessors for desktop computers, workstations, and low-end servers, often employ voltage regulator modules to work with a 12 volt input. In laptop computers, the voltage regulator modules often directly convert the battery charger voltage of 16 to 24 volts down to the microprocessor voltage of 1.5 volts. For future microprocessors, the supply voltage is expected to decrease to below one volt to further reduce power dissipation and to accommodate the fine line geometries used to form the integrated circuits that form microprocessors and the like.

For the aforementioned applications, a multi-phase power converter (e.g., a multi-phase buck power converter) is often employed to operate at very small duty cycles to regulate a low output voltage from a substantially higher input voltage. At very small duty cycles, both the transient response and the efficiency of a multi-phase power converter may be compromised. To improve power conversion efficiency without compromising transient response, alternative topologies that extend duty cycles to a higher level in such applications with a high ratio of input to output voltage would be advantageous.

An additional limitation to using magnetic cores (e.g., E-cores) for high current applications is the detrimental effects of fringing magnetic flux due to the limited cross-sectional area of a gapped center leg of the magnetic device. Fringing magnetic flux represents the magnetic flux component that strays away from the main magnetic path and spills into a core window, inducing eddy currents in the windings of the magnetic device. This results in increased losses (e.g., denoted by $I^2R$, wherein "I" represents the current and "R" represents the resistance) in the windings and reduced efficiency. To reduce the induction of eddy currents due to fringing magnetic flux, the windings are placed a safe distance from an air gap, resulting in poor conductor utilization of the core window area. In addition, fringing magnetic flux represents a loss of inductance which results in increased switching ripple in the winding currents, leading to higher losses and poorer efficiencies.

Multi-phase, interleaved power converter topologies can thus provide highly desirable power conversion designs, not only for their small size, but also for their ability to provide fast response times for a controller regulating the output voltage thereof with minimal output ripple voltage. A power converter that combines the advantages of an interleaving, multi-phase power converter topology with a circuit arrangement that can be implemented to operate at higher levels of duty cycle while substantially reducing the magnetic flux variation in a magnetic core, and with integrated magnetics is not presently available for the more severe applications that lie ahead.

Accordingly, what is needed in the art is a power converter topology that employs switches that can operate with higher levels of duty cycle, that can reduce magnetic flux changes in a magnetic core of a magnetic device thereof, and overcomes the deficiencies in the presently available power converters.

SUMMARY OF THE INVENTION

These and other problems are generally solved or circumvented, and technical advantages are generally achieved, by advantageous embodiments of the present invention that include a power converter employing a tapped inductor and method of operating the same. In one embodiment, the power converter includes a first tapped inductor including a tapped winding having a first section and a second section with a tap therebetween, and a second tapped inductor including a tapped winding having a first section and a second section with a tap therebetween. The power converter also includes a first active phase leg including a main switch series-coupled with an input node of the power converter and the first section of the tapped winding of the first tapped inductor. The first active phase leg also includes an auxiliary switch interposed between the second section of the tapped winding of the first tapped inductor and an output node of the power converter. The power converter still further includes a second active phase leg including a main switch series-coupled with an input node of the power converter and the first section of the tapped winding of the second tapped inductor. The second active phase leg also includes an auxiliary switch interposed between the second section of the tapped winding of the second tapped inductor and an output node of the power converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Unless otherwise provided, like designators for devices employed in different embodiments illustrated and described herein do not necessarily mean that the similarly designated devices are constructed in the same manner or operate in the same way. It should also be understood that the use of the terms such as "first" and "second" are employed for purposes of explanation and clarity, and reversing such designations when referring to device(s) is well within the broad scope of the present invention.

The invention will be described with respect to an exemplary embodiment in a specific context, namely, a power converter employing a main switch coupled to tapped inductor(s) constructed with, for instance, integrated magnetics. The particular embodiment described herein is a multi-phase, interleaved, dc-dc power converter topology including integrated magnetics to combine multiple tapped inductors in a single magnetic core. The principles of the present invention may be applied to other magnetic device construction arrangements, for example, inclusion of a plurality of magnetic cores in the construction arrangement with multiple tapped inductors, thereby employing less magnetic integration, as well as inclusion of one or more separate inductors not integrated with a tapped inductor.

Figure 1:
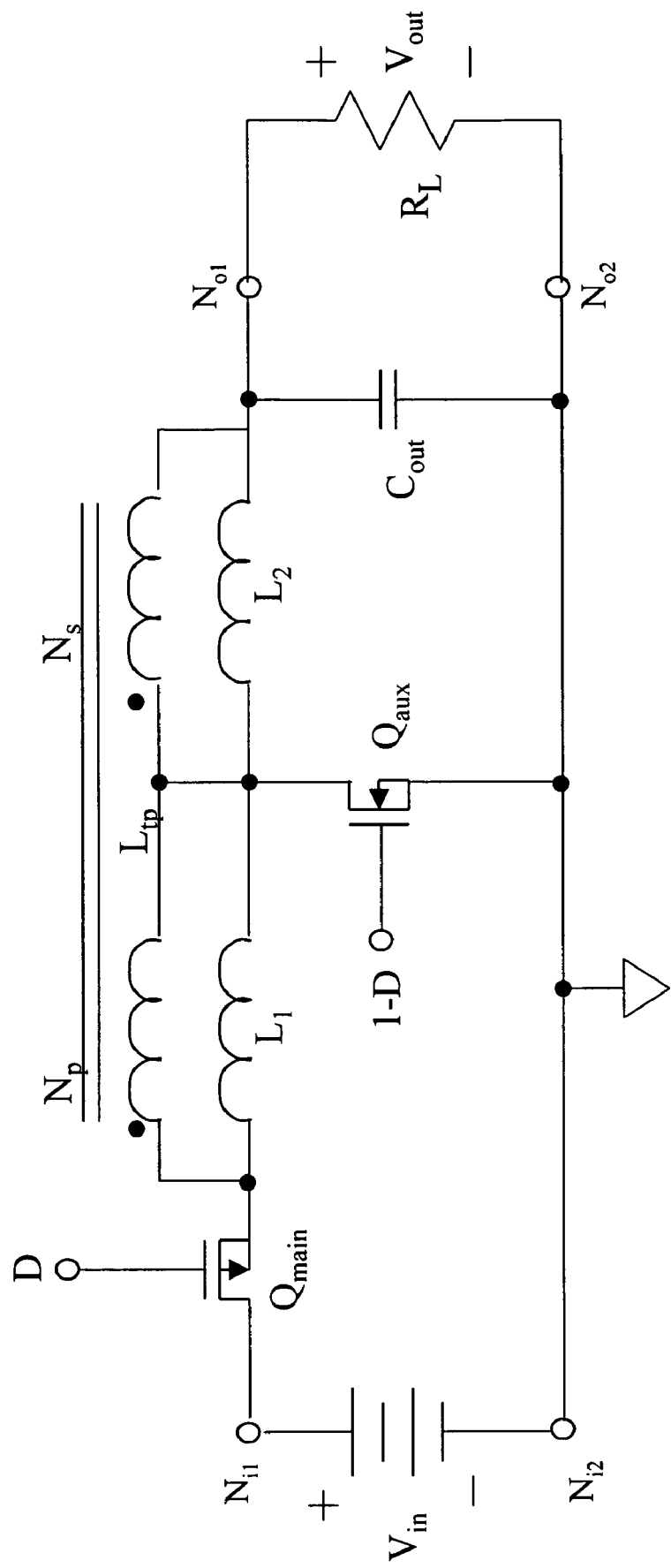
FIG. 1 illustrates a schematic diagram of an embodiment of a power converter constructed according to the principles of the present invention.

Referring now to FIG. 1, illustrated is a schematic diagram of an embodiment of a power converter constructed according to the principles of the present invention. The power converter (e.g., a single-phase tapped-inductor buck power converter) includes a main switch $Q_{main}$ and an auxiliary switch $Q_{aux}$ coupled to single-phase tapped inductor $L_{tp}$, which forms an active phase leg thereof. While the main and auxiliary switches $Q_{main}$, $Q_{aux}$ are illustrated as metal-oxide semiconductor field-effect transistors ("MOSFETs"), other switches such as insulated-gate bipolar transistors with parallel diodes can be used to advantage. The main and auxiliary switches $Q_{main}$, $Q_{aux}$ are assumed to include body diodes that are effectively coupled between their source and drain terminals thereof.

The drain terminal of the main switch $Q_{main}$ is coupled to a positive terminal of a source of electrical power (represented by a battery) that provides an input voltage $V_{in}$ for the power converter at input nodes $N_{i1}$, $N_{i2}$. The source terminal of the main switch $Q_{main}$ is coupled to a winding of the tapped inductor $L_{tp}$. The first and second inductors $L_1$, $L_2$ represent magnetizing inductances of the tapped inductor $L_{tp}$. The auxiliary switch $Q_{aux}$ operates as a synchronous rectifier for the power converter. In an alternative embodiment, the auxiliary switch $Q_{aux}$ can be replaced with a diode or with an alternative active rectifying element. A load (represented by a resistor $R_L$) is coupled to output terminals $N_{o1}$, $N_{o2}$ of the power converter. An output capacitor $C_{out}$ is preferably included in the power converter to filter the output voltage $V_{out}$ produced at the output terminals $N_{o1}$, $N_{o2}$ of the power converter.

During normal switching operation of the power converter, the main switch $Q_{main}$ is enabled to conduct during a period designated $0<t<DT_s$, where $T_s$, represents the switching period for the power converter and D represents duty cycle for the main switch $Q_{main}$. The auxiliary switch $Q_{aux}$ is enabled to conduct during a complementary period designated $DT_s<t<T_s$. Additionally, a brief dead time may be interposed between the conduction periods of the main and auxiliary switches $Q_{main}$, $Q_{aux}$ to avoid cross conduction and to accommodate reduced-voltage or zero-voltage switching therefor. Thus, the main and auxiliary switches $Q_{main}$, $Q_{aux}$ conduct in a substantially complementary manner. In other embodiments, other control schemes may be used such as providing substantial dead time between the closure of the main and auxiliary switches $Q_{main}$, $Q_{aux}$. If a diode is employed for the auxiliary switch $Q_{aux}$, the diode typically will be forward biased during the complementary period of the switching cycle, particularly during continuous conduction mode of operation of the power converter.

Figure 2:
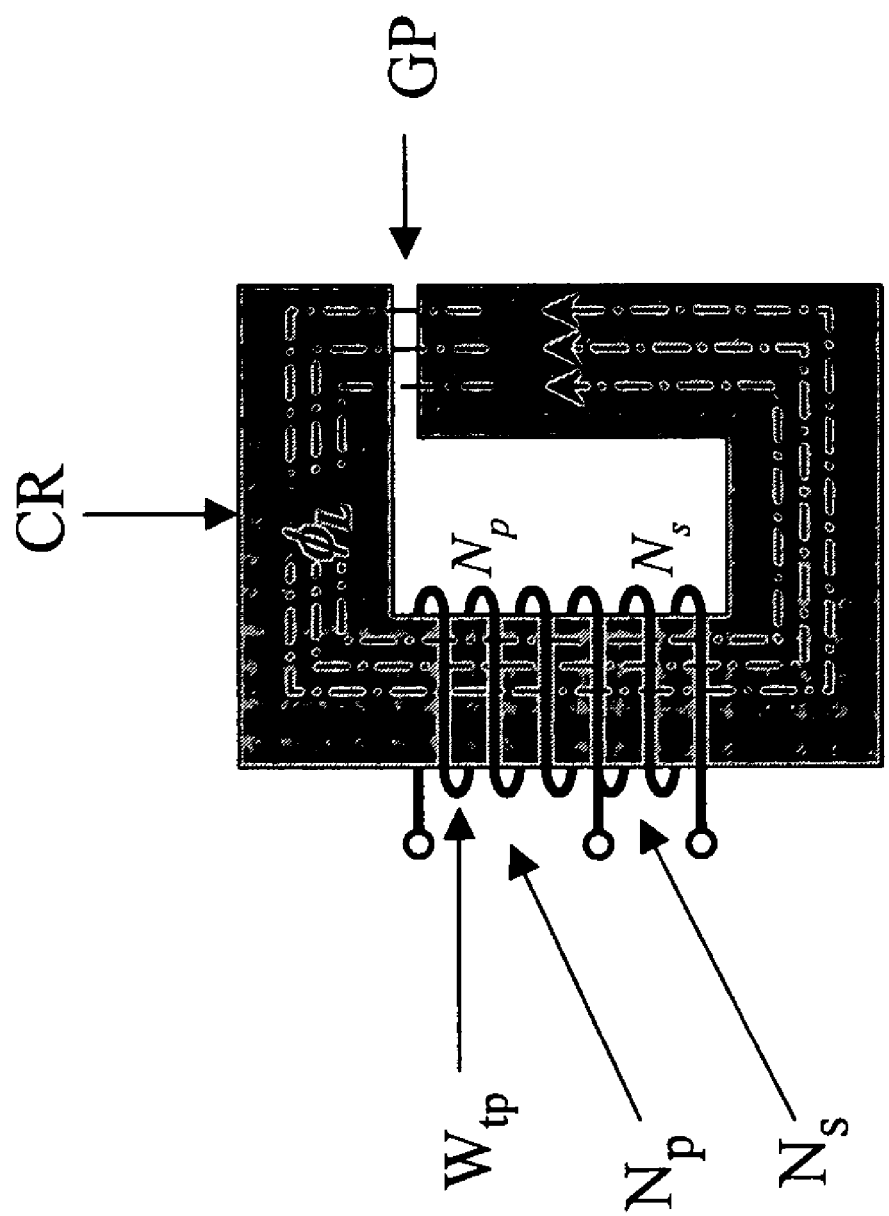
FIG. 2 illustrates a side view of an embodiment of a magnetic device constructed according to the principles of the present invention.

Turning now to FIG. 2, illustrated is a side view of an embodiment of a magnetic device constructed according to the principles of the present invention. The magnetic device is analogous to the tapped-inductor $L_{tp}$ illustrated and described with respect to FIG. 1. The tapped inductor is formed using a magnetic core (designated as "CR"), such as a soft ferrite core, including an air gap (designated "GP") in a magnetic path thereof. A tapped winding $W_{tp}$ is wound around one leg of the magnetic core CR with primary turns $N_p$ in a first section of the tapped winding $W_{tp}$ and secondary turns $N_s$ in a second section of the tapped winding $W_{tp}$. A current in either section of the tapped winding $W_{tp}$ produces a magnetic flux $\phi_L$ in the magnetic core CR and in the air gap GP as indicated therein.

Figure 3:
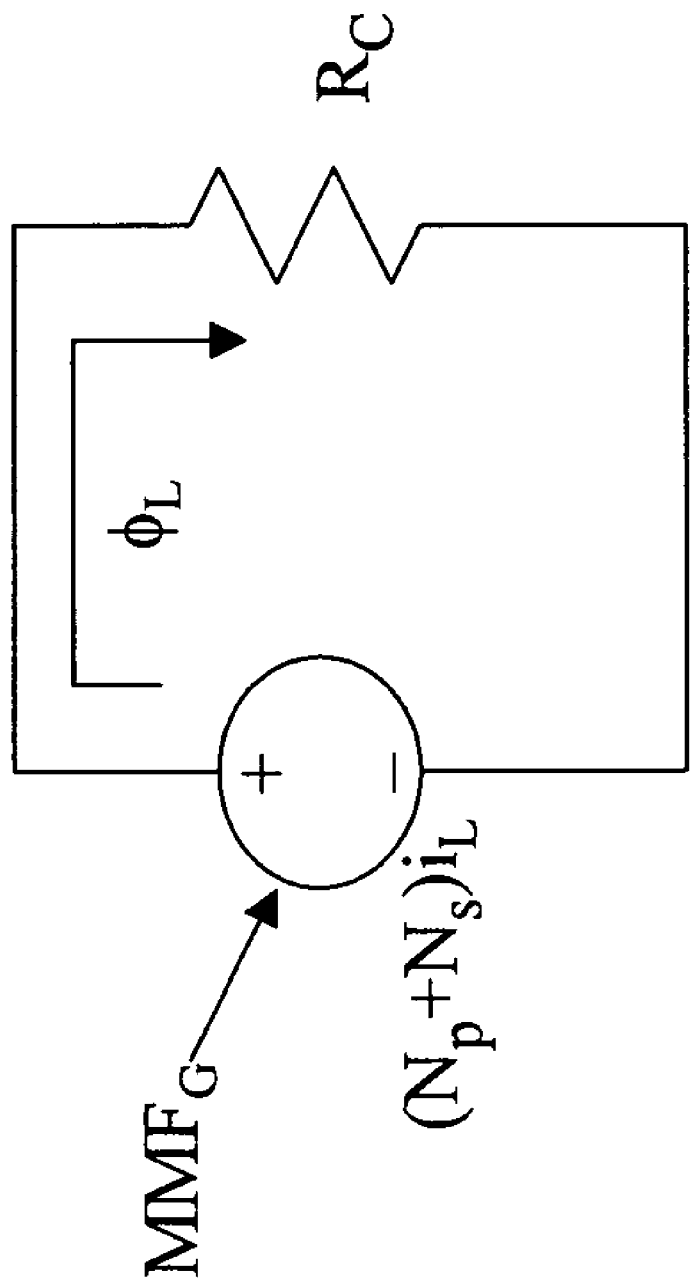
FIG. 3 illustrates a reluctance model of a magnetic device constructed according to the principles of the present invention.

Turning now to FIG. 3, illustrated is a reluctance model of a magnetic device constructed according to the principles of the present invention. More specifically, the illustrated reluctance model represents the tapped inductor $L_{tp}$ represented in the aforementioned FIGUREs. A magnetomotive force generator (designated "MMFG") induces magnetomotive force of magnitude $[(N_p+N_s)i_L]$ in a magnetic core and an air gap (see, for instance, FIG. 2). It should be understood that lower case variables used to denote currents and voltages represent instantaneous values while upper case variables denote corresponding average values. A tapped winding (such as the tapped winding $W_{tp}$ in FIG. 2) is formed with primary and secondary turns represented by $(N_p+N_s)$, and is assumed to conduct a current "$i_L$" through both of the first and second sections thereof, resulting in the magnetic flux $\phi_L$ represented therein. The reluctance of the magnetic core and the air gap is represented by a resistor with reluctance $R_C$.

Figure 4:
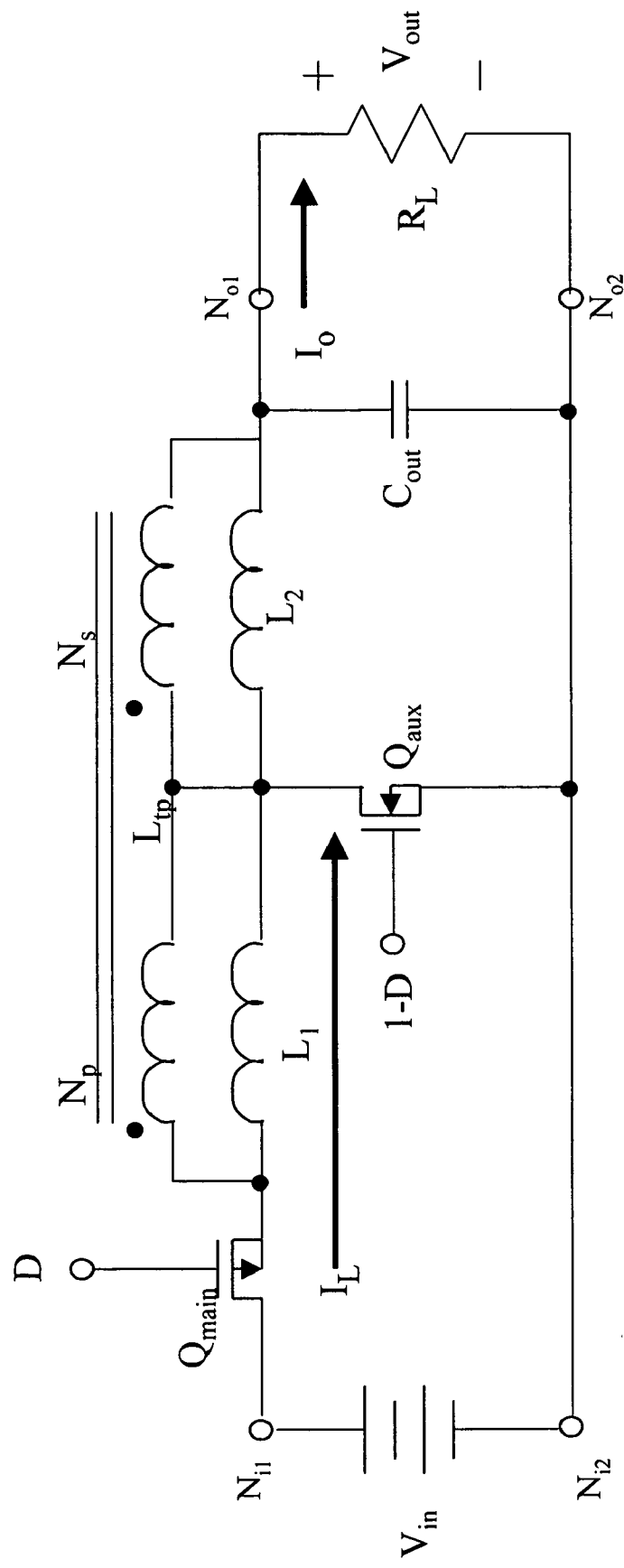
FIGS. 4 and 5 illustrate schematic diagrams demonstrating exemplary operations of an embodiment of a power converter constructed according to the principles of the present invention.
Figure 5:
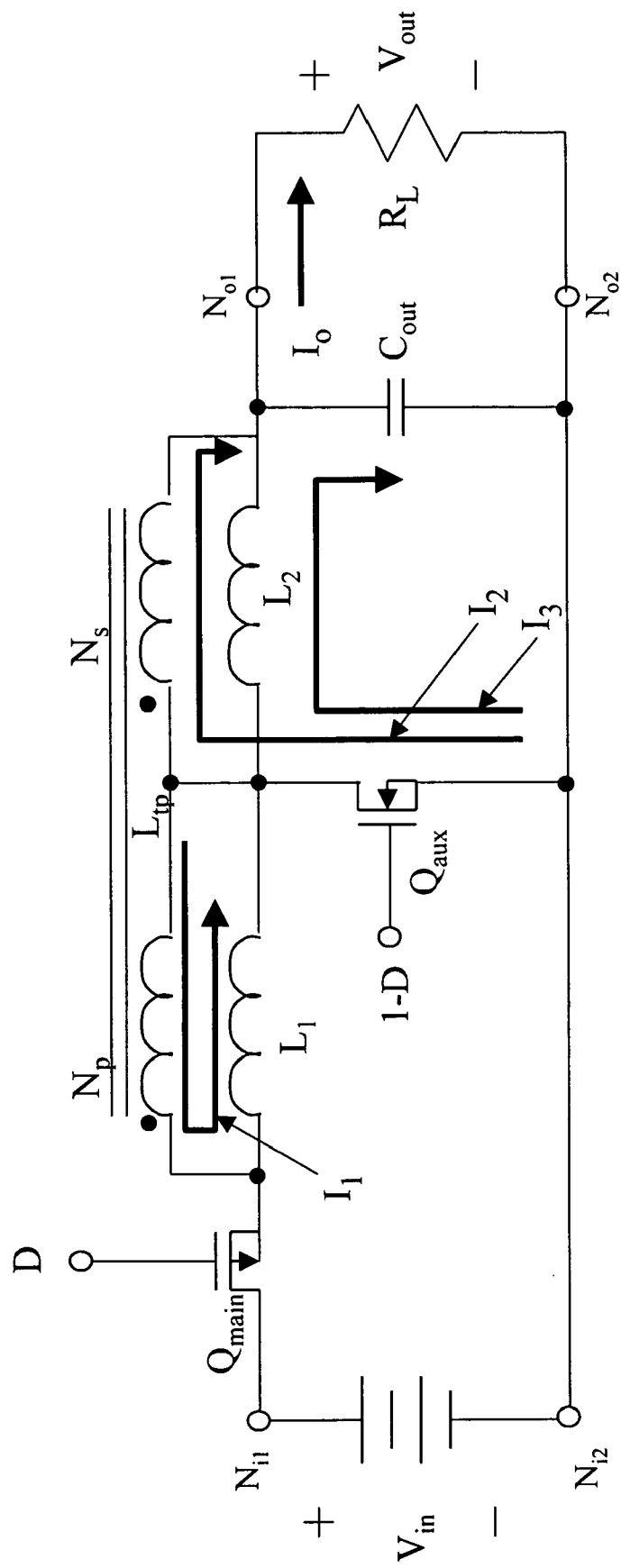

Turning now to FIGS. 4 and 5, illustrated are schematic diagrams demonstrating exemplary operations of an embodiment of a power converter constructed according to the principles of the present invention. In particular, the illustrated embodiments demonstrate exemplary operations of the power converter illustrated and described with respect to FIG. 1. In FIG. 4, during a period when the main switch $Q_{main}$ is enabled to conduct (i.e., during a period represented by $0<t<DT_s$), a current $i_L$ flows from the source of electrical power through the magnetizing inductances represented by first and second inductors $L_1$, $L_2$ of the tapped inductor $L_{tp}$ toward the output of the power converter. Thus, main switch $Q_{main}$ is controlled to induce the magnetizing current $i_L$ from the source of electrical power into the tapped winding of the active phase leg. The magnetizing current $I_L$ is the input current from the source of electrical power when the main switch $Q_{main}$ is turned on.

In FIG. 5, during the period when the main switch $Q_{main}$ is not enabled to conduct and the auxiliary switch $Q_{aux}$ is enabled to conduct (i.e., during a complementary period $DT_s<t<T_s$), a first current $I_1$ flows through the magnetizing inductance represented by the first inductor $L_1$ and the first section of the tapped winding (with primary turns $N_p$) of the tapped inductor $L_{tp}$. To satisfy continuity of current, the first current $I_1$ flowing through the first winding is equal to the magnetizing current $i_L$. A second current $I_2$ flows through the auxiliary switch $Q_{aux}$ through the second section of the tapped winding (with secondary turns $N_s$) of the tapped inductor $L_{tp}$. This represents the energy stored in the first inductor $L_1$ due to the current $i_L$. Hence, the second current $I_2$ is equal to the magnetizing current $i_L$ scaled by the turns ratio $N_p/N_s$. In addition, a third current $I_3$ flows through the magnetizing inductance represented by the second inductor $L_2$. This component is the magnetizing current $i_L$ that was flowing through the second inductor $L_2$ when the main switch $Q_{main}$ was enabled. Finally, an output current $I_o$ flows to the load (represented by a resistor $R_L$). Thus, the auxiliary switch $Q_{aux}$ operates to provide an output current $I_o$ at an output node $N_{o1}$ via the second section of the tapped winding of the tapped inductor $L_{tp}$. The magnitude of the currents $I_1$, $I_2$, $I_3$ can be readily estimated from field continuity equations for a magnetic device, as is well understood in the art. The current $i_L$ represents the magnetizing current and is directly proportional to the magnetic flux flowing in the corresponding leg of a magnetic core of the tapped inductor $L_{tp}$.

The secondary turns $N_s$ of the tapped inductor $L_{tp}$ typically will have fewer turns than the primary winding $N_p$. Consequently, substantial currents for the second and third currents $I_2$, $I_3$ can be conducted from ground to an output node of the power converter with little power loss. Circuit elements with the same reference designations in the FIGUREs will not be redescribed in the interest of brevity.

Figure 6:
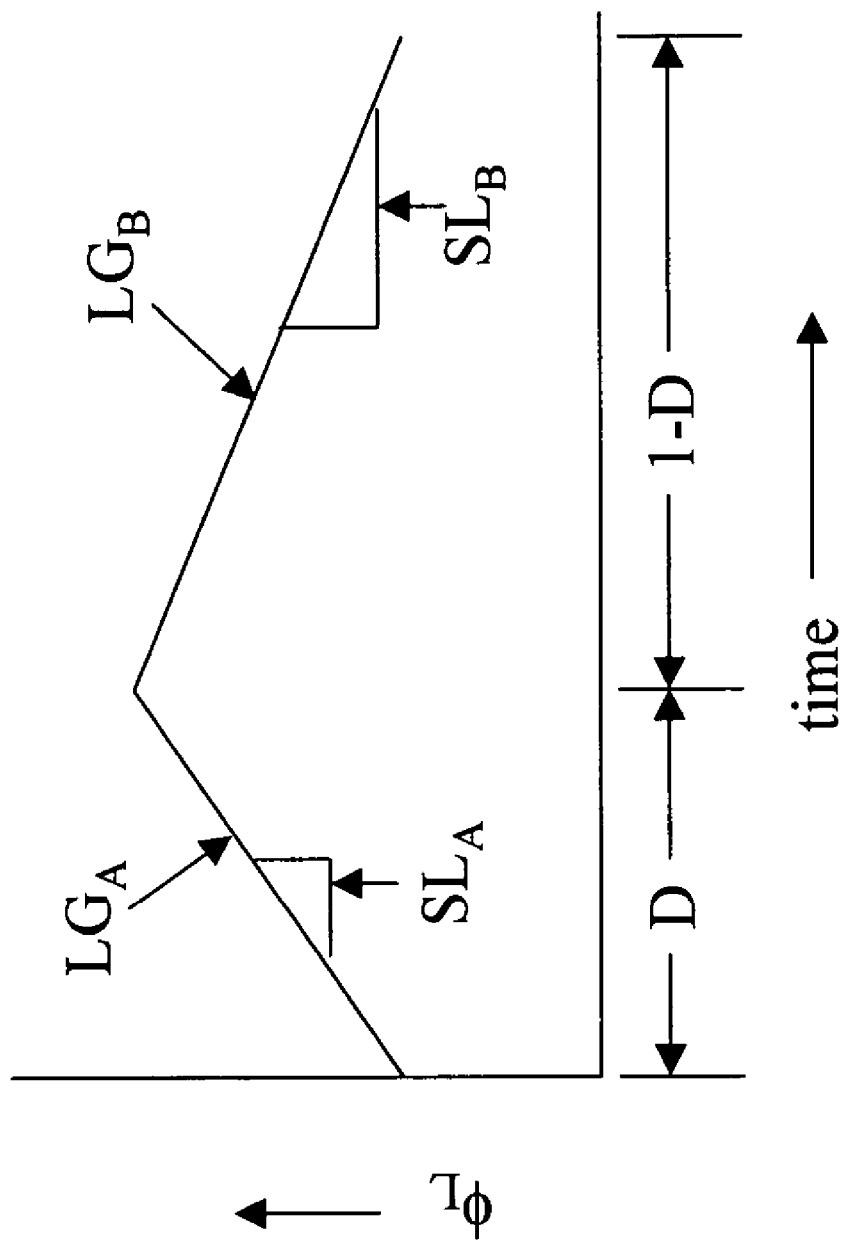
FIG. 6 illustrates a graphical representation of the change of magnetic flux in one leg of a magnetic device in a power converter constructed according to the principles of the present invention.

Turning now to FIG. 6, illustrated is a graphical representation of the change of magnetic flux in one leg of a magnetic device in a power converter constructed according to the principles of the present invention. More specifically, the graphical representation illustrates the magnetic flux $\phi_L$ flowing in a leg of the magnetic core illustrated and described with respect to FIG. 2 for the exemplary operations illustrated and described with respect to FIGS. 5 and 6. During the portion of a switching cycle when the main switch $Q_{main}$ is enabled to conduct (i.e., during a period $0<t<DT_s$), the magnetic flux $\phi_L$ in the magnetic core increases according to the equation $$(N_p + N_s)\frac{d\phi_L}{dt} = V_{in} - V_{out},$$

representing the segment $LG_A$ of the magnetic flux waveform, and the expression $$\frac{V_{in} - V_{out}}{N_p + N_s},$$

representing the slope $SL_A$.

During a complementary period (i.e., $DT_s<t<T_s$), the magnetic flux $\phi_L$ in the magnetic core decreases according to the equation $$N_s \frac{d\phi_L}{dt} = -V_{out},$$

representing the segment $LG_B$ of the magnetic flux waveform, and the expression $$\frac{-V_{out}}{N_s},$$

representing the slope $SL_B$. During steady-state operation, the magnetic flux $\phi_L$ returns to the same level at the end of a switching cycle as it had at the beginning of the switching cycle.

Figure 7:
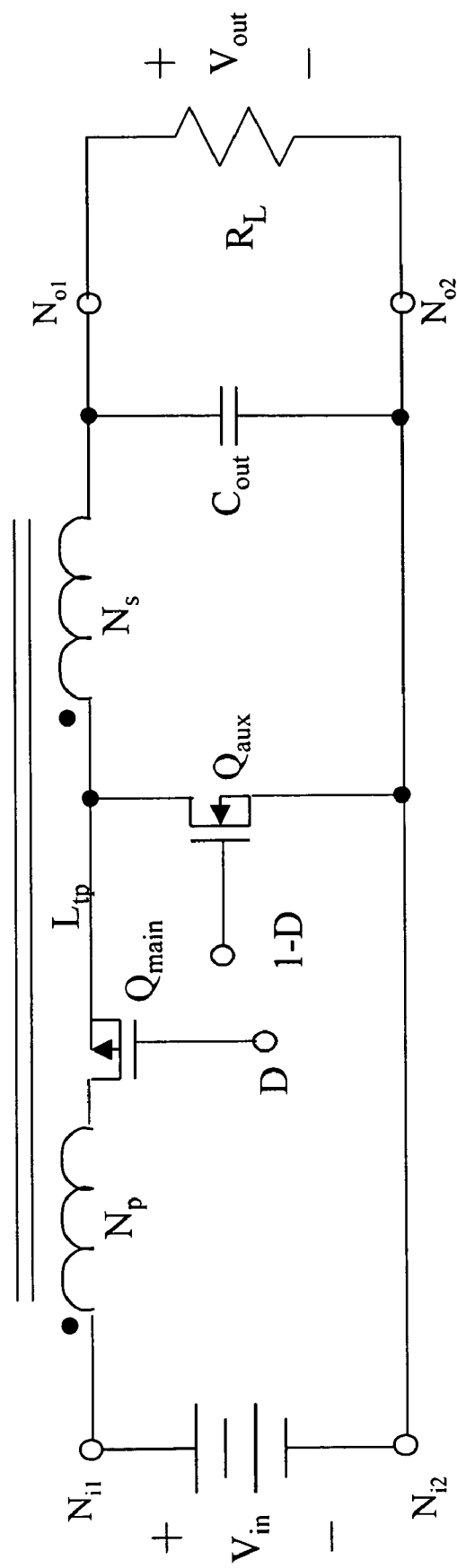
FIG. 7 illustrates a schematic diagram of another embodiment of a power converter constructed according to the principles of the present invention.

Turning now to FIG. 7, illustrated is a schematic diagram of another embodiment of a power converter (e.g., a single-phase tapped-inductor buck power converter) constructed according to the principles of the present invention. In the illustrated embodiment, the series position of the main switch $Q_{main}$ and the first section of the tapped winding (with primary turns $N_p$) of the tapped inductor $L_{tp}$ are reversed in comparison to their positions indicated in the power converter illustrated and described with respect to FIG. 1. The tapped inductor $L_{tp}$ is formed from two separated winding sections (i.e., the first and second winding section) and the operation thereof is substantially the same as provided above with respect to the power converter illustrated and described with respect to FIG. 1, et seq.

An equation representing the input-output voltage ratio for a power converter can be readily derived recognizing that the volt-seconds per turn over a switching period during steady-state operation for the tapped inductor $L_{tp}$ during the period $0<t<DT_s$, when the main switch $Q_{main}$ is conducting, and during the complementary period (i.e., $DT_s<t<T_s$), when the auxiliary switch $Q_{aux}$ is conducting, are equal and is set forth below:

$$\frac{1}{N_p + N_s} \cdot D \cdot (V_{in} - V_{out}) = \frac{1}{N_s} \cdot (1-D) \cdot V_{out}.$$

From the aforementioned equation, the steady-state ratio of the dc component of the output voltage $V_{out}$ to the input voltage $V_{in}$ of the power converter can readily be derived as set forth below:

$$\frac{V_{out}}{V_{in}} = \left(\frac{N_s}{N_p}\right) \cdot \left[\frac{D}{\left(1 - D + \frac{N_s}{N_p}\right)}\right].$$

Representing the ratio of the output voltage $V_{out}$ to the input voltage $V_{in}$ of the power converter by a parameter M, the aforementioned equation can alternatively be represented as:

$$D = \frac{\left(1 + \frac{N_p}{N_s}\right) \cdot \frac{V_{out}}{V_{in}}}{\left(1 + \left(\frac{N_p}{N_s}\right) \cdot \left(\frac{V_{out}}{V_{in}}\right)\right)} = \frac{\left(1 + \frac{N_p}{N_s}\right) \cdot M}{\left(1 + \left(\frac{N_p}{N_s}\right) \cdot M\right)}.$$

Figure 8:
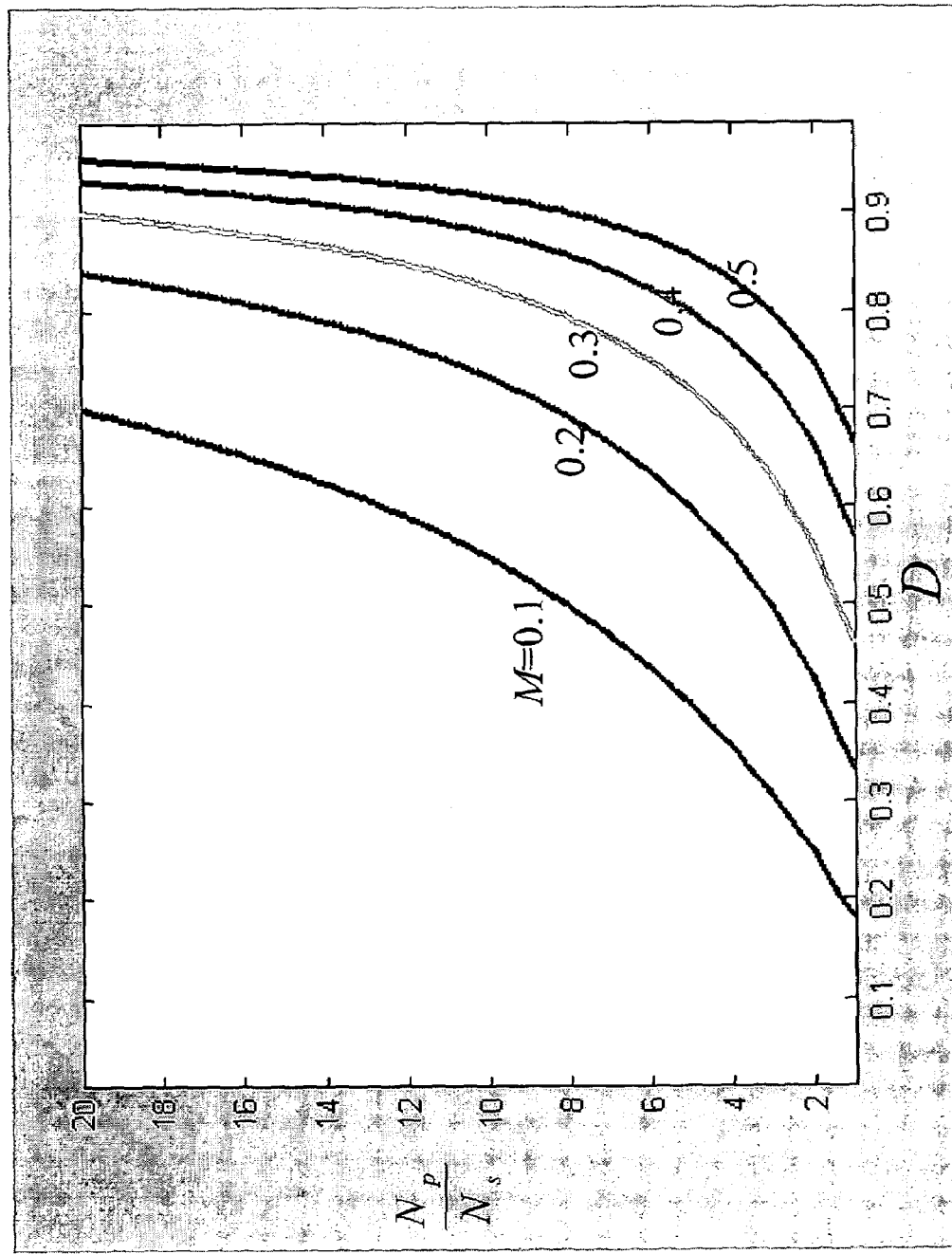
FIG. 8 illustrates a graphical representation of contour plots of the ratio of output voltage to input voltage as a function of duty cycle and the turns ratio of coupled sections of windings for a power converter constructed according to the principles of the present invention.

Turning now to FIG. 8, illustrated is a graphical representation of contour plots of the ratio of output voltage to input voltage as a function of the turns ratio of coupled sections of windings and the duty cycle for a power converter constructed according to the principles of the present invention. The graph includes contour plots for various ratios of output voltage to input voltage (i.e., for the parameter M representing a ratio of the output voltage to the input voltage). The graph is representative in that imperfect power converter efficiency as well as delays between the enabled conduction periods for the switches has been ignored. In reality, the duty cycle D may be slightly larger than that shown by the graphical representation provided in FIG. 8.

For a conventional buck power converter, the ratio of output voltage to input voltage is the duty cycle D, resulting in very small duty cycles for low ratios of output voltage to input voltage. As illustrated in FIG. 8, by selecting a suitably high winding turns ratio $N_p/N_s$ for a tapped inductor, the duty cycle D can be designed to be reasonably large, even for a very low ratio of output voltage to input voltage. For example, for the case of an input voltage of 12 volts and an output voltage of 1.5 volts, by selecting a winding turns ratio $N_p/N_s$ of about 7:1, the resulting duty cycle is 0.5. For a conventional buck power converter for the same input and output voltages, the duty cycle would be about 0.125, which is significantly smaller than the power converter of the present invention and would result in an inefficient buck power converter design.

Figure 9:
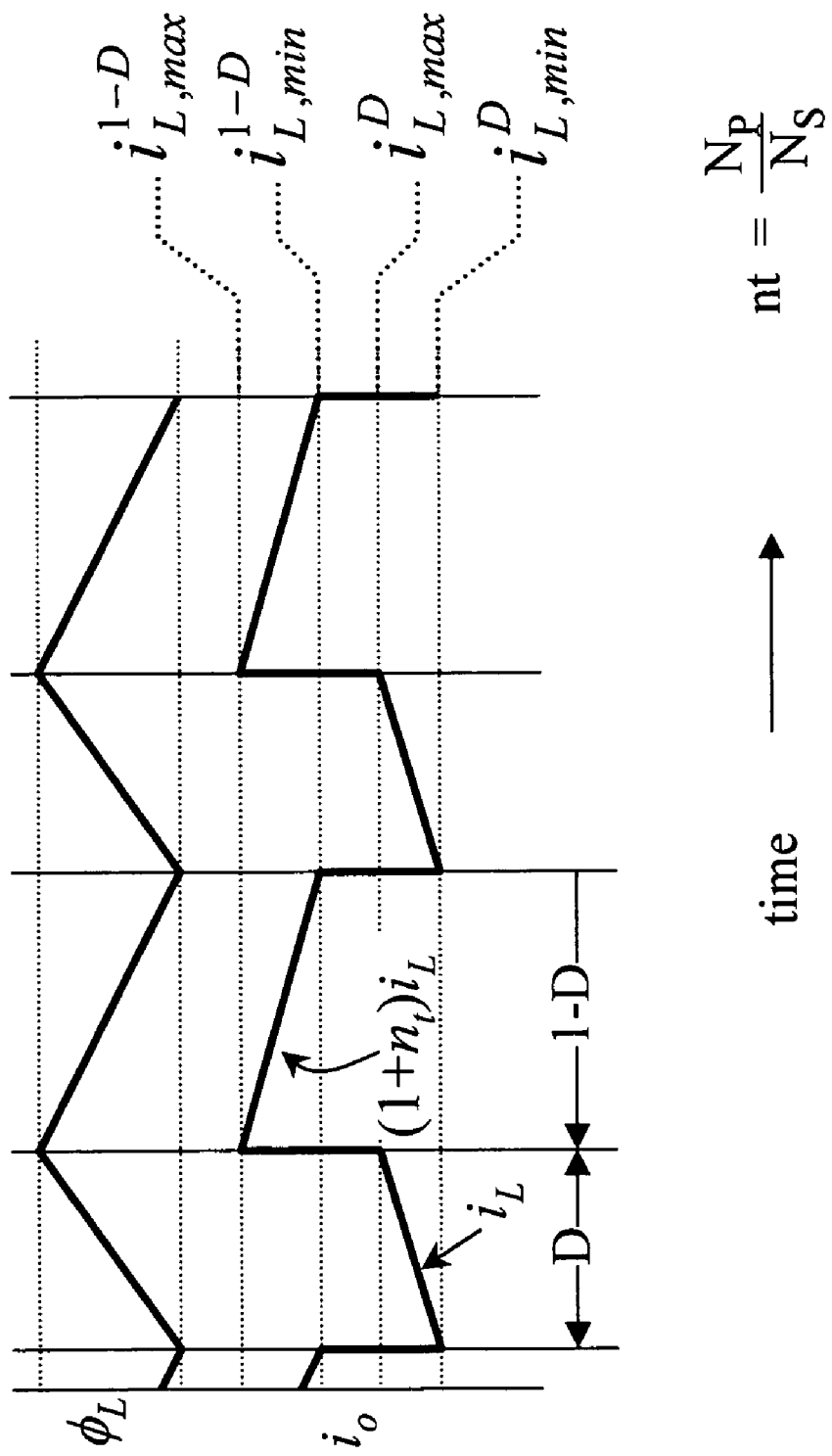
FIG. 9 illustrates a graphical representation of waveforms for magnetic flux in one leg of a magnetic device and output current from one active phase leg for a power converter constructed according to the principles of the present invention.

Turning now to FIG. 9, illustrated is a graphical representation of waveforms for magnetic flux in one leg of a magnetic device and output current from one active phase leg for a power converter constructed according to the principles of the present invention. The upper waveform provided in FIG. 9 represents the magnetic flux $\phi_L$ in a core leg of a tapped-inductor for a power converter constructed according to the principles of the present invention. In the lower waveform of FIG. 9, the corresponding component of output current $i_o$ produced by a respective active phase leg of the power converter is illustrated. The aforementioned waveforms are provided for periods associated with a duty cycle D and a complementary duty cycle 1-D of the power converter, and maximum and minimum values of the output current $i_o$ are also provided therein. The step changes in the output current $i_o$ result from switching transitions of main switch $Q_{main}$ and the auxiliary switch $Q_{aux}$ of the power converter (see, for instance, FIG. 1) at the beginning and end of a duty cycle D as evident from the illustration.

From further circuit analysis, it can be readily demonstrated that the dc level of the current $I_{main}$ associated with the main switch $Q_{main}$ can be related to the magnetizing current $i_L$ and hence, the magnetic flux $\Phi_L$ in a leg of a magnetic core by the equation:

$$I_{main} = D \cdot I_L = \frac{D \cdot R_C \Phi_L}{N_p + N_s},$$

where D is the steady-state duty cycle of the power converter, and $R_C$ is the reluctance of the magnetic path through the magnetic core. The currents $I_{main}$, $I_L$ represent the average values of the respective currents. In general, upper case letters for variables denote corresponding average values. For example, $\Phi_L$ represents average value of magnetic flux $\phi_L$. The corresponding dc level of a current $I_{aux}$ in the auxiliary switch $Q_{aux}$ is given by the equation:

$$I_{aux} = \left(1 + \frac{N_p}{N_s}\right) \cdot (1 - D) \cdot \frac{R_C \cdot \Phi_L}{N_p + N_s}.$$

The dc value of the output current $I_o$ for the power converter is given by the equation:

$$I_0 = \left(1 + \frac{N_p}{N_s} \cdot (1 - D)\right) \cdot \frac{R_C \cdot \Phi_L}{N_p + N_s}.$$

The dc value $\Phi_L$ of the magnetic flux $\phi_L$ in the magnetic core is related to the dc output current of the power converter by the equation:

$$\Phi_L = \frac{N_p + N_s}{R_C} \cdot \frac{1}{(1 + n_t \cdot (1 - D))} \cdot I_o.$$

Figure 10:
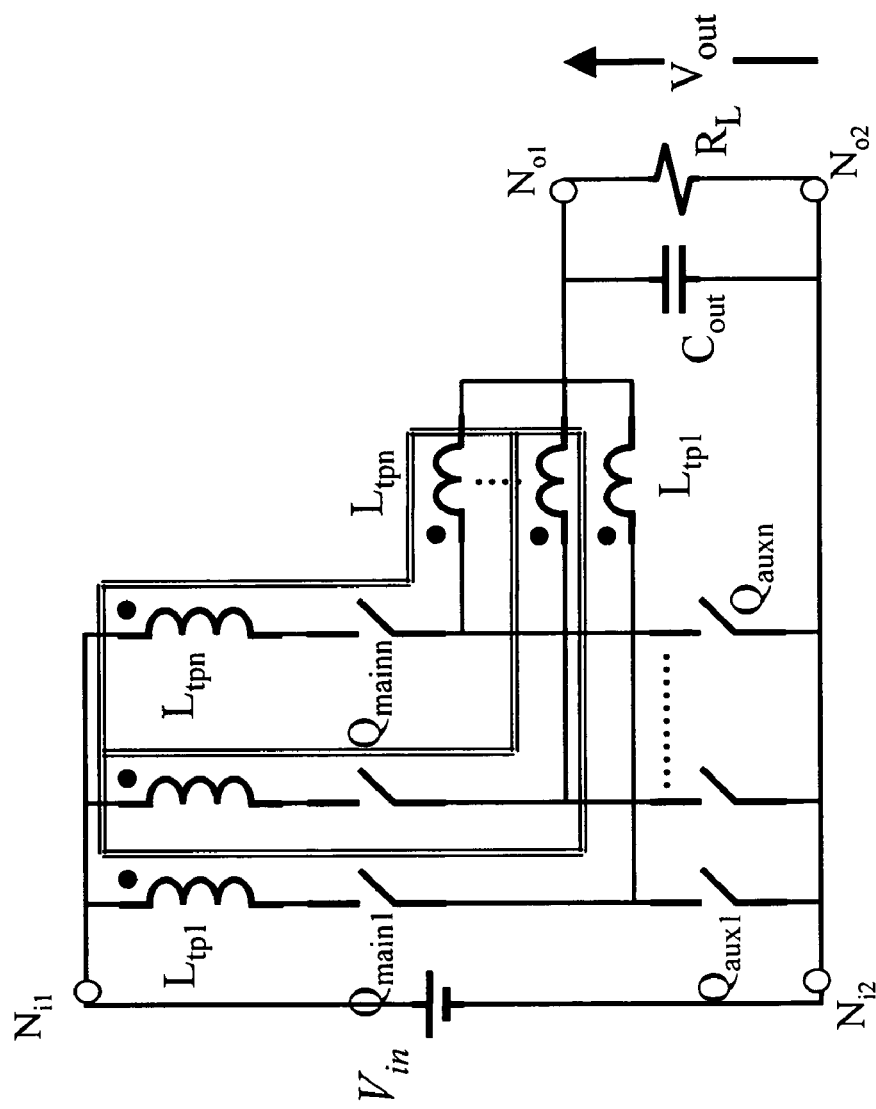
FIG. 10 illustrates a schematic diagram of an embodiment of a power converter constructed according to the principles of the present invention.

Turning now to FIG. 10, illustrated is a schematic diagram of an embodiment of a power converter (e.g., n-phase tapped-inductor buck power converter) constructed according to the principles of the present invention, which form a plurality "n" of interleaved active phase legs. The power converter is coupled to a source of electrical power (represented by a battery) for supplying an input voltage $V_{in}$ at input nodes $N_{i1}$, $N_{i2}$ thereof, and produces an output voltage $V_{out}$ at output nodes $N_{o1}$, $N_{o2}$ to power a load represented by a resistor $R_L$. The power converter includes a plurality of coupled pairs of windings having a first section of a tapped winding (with primary turns $N_p$) and a second section of the tapped winding (with secondary turns $N_s$) of tapped inductors $L_{tp1}, \ldots, L_{tpn}$. The first and second sections of the tapped windings are preferably coupled on a common magnetic core leg.

Each pair of tapped windings of the tapped inductors $L_{tp1}, \ldots, L_{tpn}$ is coupled to a corresponding active phase leg formed by a corresponding main switch $Q_{main1}, \ldots, Q_{mainn}$ and a corresponding auxiliary switch $Q_{aux1}, \ldots, Q_{auxn}$. The operation of each active phase leg is substantially similar to that of the single-phase tapped-inductor buck power converter illustrated and described with respect to FIGS. 1, 4, and 5. The power converter preferably includes an output capacitor $C_{out}$ to filter the output voltage $V_{out}$ of the power converter. In a preferred embodiment, the timing of the switching periods of each active phase leg of the power converter is successively delayed by a fraction 1/n of a switching period to reduce the output ripple current.

Figure 11:
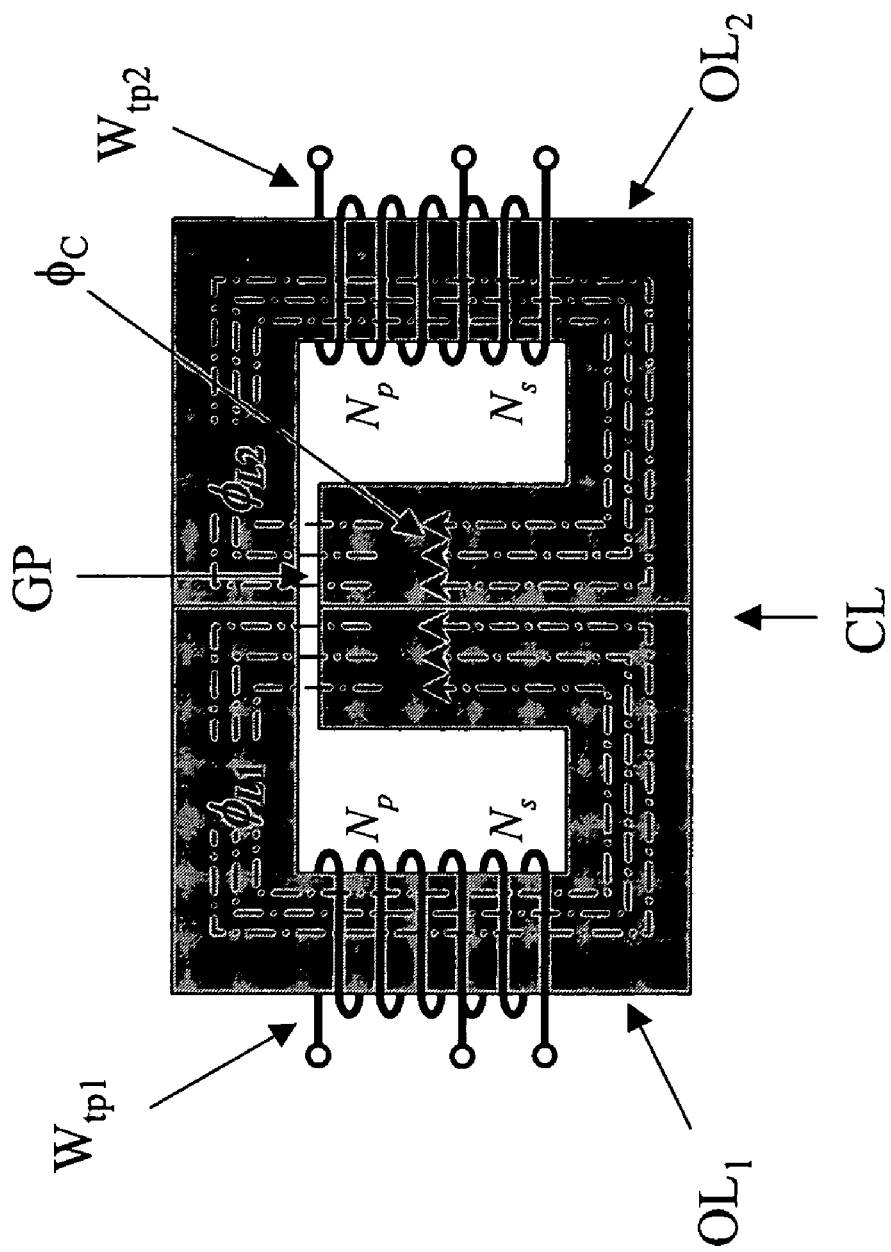
FIG. 11 illustrates a side view of another embodiment of a magnetic device constructed according to the principles of the present invention.

Turning now to FIG. 11, illustrated is a side view of another embodiment of a magnetic device constructed according to the principles of the present invention. The embodiment illustrated in FIG. 11 provides an integrated, two-phase tapped inductor employable, for instance, with the power converter illustrated and described with respect to FIG. 10. The magnetic device has first and second outer legs $OL_1$, $OL_2$ and a center or common leg (designated "CL") that accommodates a common magnetic flux return path. The magnetic fluxes in the two outer legs are represented as $\phi_{L1}$ and $\phi_{L2}$. The magnetic fluxes in the outer legs are functionally equivalent to the magnetic flux $\phi_L$ represented in FIGS. 2 and 3. In the integrated magnetics case, the magnetic flux $\phi_C$ in the common return path or the common leg is the sum of the outer leg magnetic fluxes $\phi_{L1}$, $\phi_{L2}$. The tapped windings $W_{tp1}$, $W_{tp2}$ (including first and second sections thereof with a tap therebetween and having primary turns $N_p$ and secondary turns $N_s$) of the tapped inductors $L_{tp1}$, $L_{tp2}$ encircle the first and second outer legs $OL_1$, $OL_2$, respectively. The reluctance of the magnetic paths coupling the outer legs $OL_1$, $OL_2$ may be advantageously less than the reluctance of the common magnetic flux return path to distribute the magnetic flux more uniformly in the common magnetic flux return path. The reluctance of the common magnetic flux return path may be suitably increased by including an air gap GP as illustrated therein.

Figure 12:
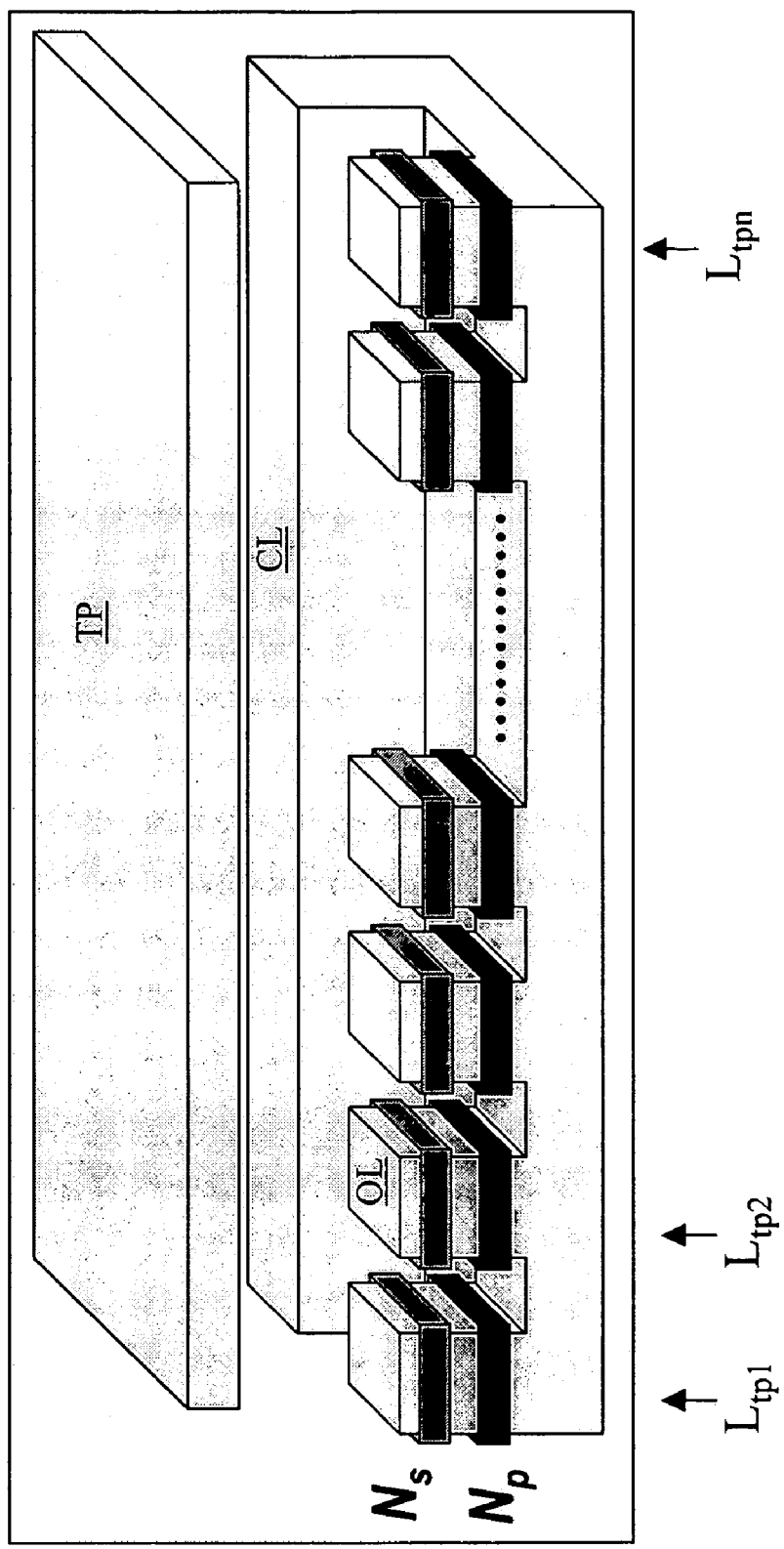
FIG. 12 illustrates a perspective view of another embodiment of a magnetic device constructed according to the principles of the present invention.

Turning now to FIG. 12, illustrated is a perspective view of another embodiment of a magnetic device constructed according to the principles of the present invention. The magnetic device includes a matrix integrated magnetic device for a power converter (e.g., an n-phase, tapped-inductor buck power converter) having a plurality of outer legs and a common leg to accommodate a common magnetic flux return path constructed according to the principles of the present invention. The matrix integrated magnetic device includes a magnetic core with "n" outer legs (one leg of which is designated "OL"), preferably a single center or common leg (designated "CL") that accommodates a common magnetic flux return path, and a top plate (designated "TP"). Each outer leg OL preferably accommodates a coupled pair of windings having a first section of a tapped winding (with primary turns $N_p$) and a second section of the tapped winding (with secondary turns $N_s$) of tapped inductors (designated "$L_{tp1}$, $L_{tp2}$, . . . $L_{tp3}$"). In other words, the first and second winding sections of the tapped winding of the tapped inductor may be a coupled pair about the outer legs OL. A plurality of core structures may be used in alternative embodiments to synthesize a matrix integrated magnetic device for a power converter as described herein. The top plate TP thereof substantially completes the magnetic flux return path to the outer legs OL.

Although FIG. 12 illustrates the outer legs OL on one side of the common magnetic flux return path, other geometries are well within the broad scope of the invention such as outer legs distributed on two or more sides of a common leg or outer legs distributed in a substantially circular arrangement around a common leg. An air gap may be included between the top plate TP and the common leg CL to increase the reluctance of the path of the common magnetic flux $\phi_C$. A substantially nonmagnetic, nonconductive material such as a plastic film may be used to form and dimensionally control the magnetic "air gap" (as it is often referred to), as is well known in the art. Essentially, a magnetic core of the matrix integrated magnetic device integrates an n-phase tapped-inductor arrangement in a single and compact magnetic structure. The winding directions and terminal connections for the first and second sections of the windings of the tapped inductors may be determined according to the dot notation illustrated with respect to FIG. 1.

Other physical configurations for the matrix integrated magnetic device may be used such as provided in the following references, namely, U.S. Pat. No. 6,873,237, entitled *Core Structure*, to S. Chandrasekaran, et al., issued Mar. 29, 2005, U.S. Patent Publication No. 2003/0198067, entitled *Core Structure and Interleaved DC-DC Converter Topology*, to J. Sun, et al., published Oct. 23, 2003, U.S. Pat. No. 6,980,077, entitled *Composite Magnetic Core for Switch-Mode Power Converters*, to S. Chandrasekaran, et al., issued Dec. 27, 2005, U.S. Patent Publication No. 2005/0024179, entitled *Extended E Matrix Integrated Magnetics (MIM) Core*, to S. Chandrasekaran, et al., published Feb. 3, 2005, and U.S. Patent Publication No. 2006/0038650, entitled *Vertical Winding Structures For Planar Magnetic Switched-Mode Power Converters*, to V. Mehrotra, et al., published Feb. 23, 2006, all of which are incorporated herein by reference.

Figure 13:
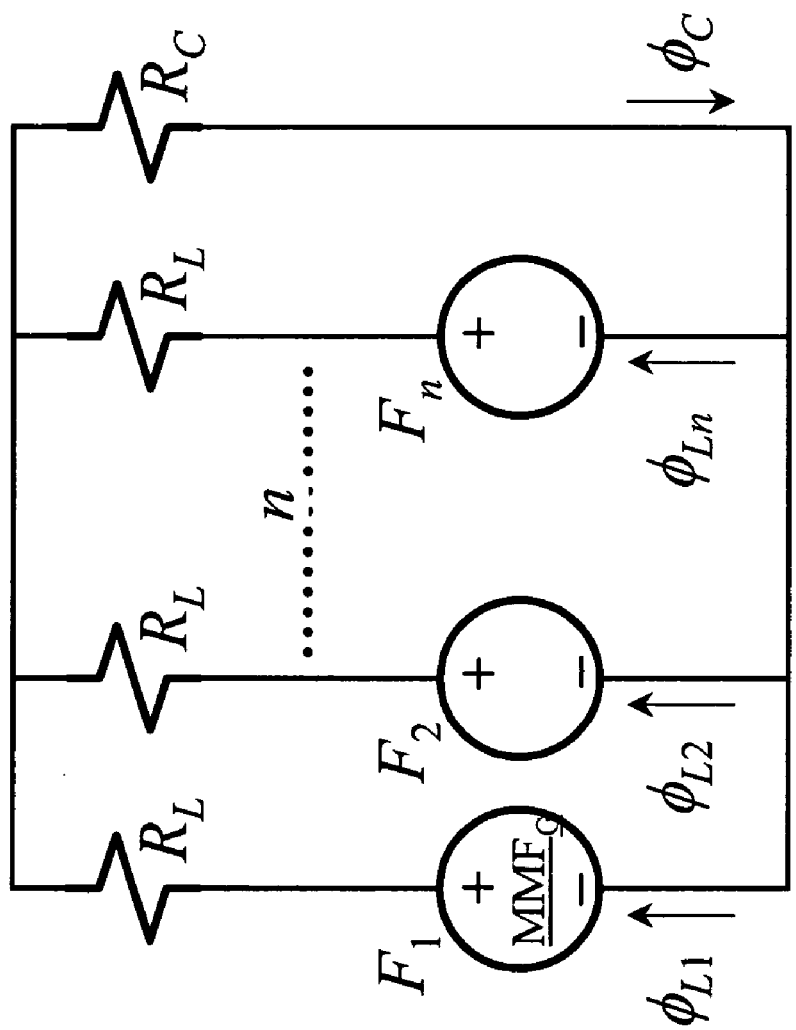
FIG. 13 illustrates a reluctance model of a power converter constructed according to the principles of the present invention.

Turning now to FIG. 13, illustrated is a reluctance model of a power converter constructed according to the principles of the present invention. The illustrated embodiment provides a reluctance model for an n-phase tapped-inductor buck power converter, wherein $R_C$ represents the reluctance of a common leg that accommodates a common magnetic flux return path, assumed without restriction to be linear, and wherein $R_L$ represents the reluctance of an outer leg, also assumed without restriction to be linear. The magnetic fluxes are induced by magnetomotive force generators (one of which is designated "MMF$_G$") that produce magnetomotive forces proportional to the current in a winding times the number of turns therein. The magnetic fluxes in the outer legs are represented by magnetic fluxes $\phi_{L1}, \phi_{L1}, \ldots \phi_{Ln}$, and magnetic flux in the common leg is represented by magnetic flux $\phi_C$. The reluctances of the outer legs are preferably equal as represented by the common symbol $R_L$. In a preferred embodiment, the reluctance $R_C$ of the common leg is advantageously greater than the reluctance $R_L$ of the outer legs.

The currents $i_{Lk}$ represent the magnetizing currents corresponding to the windings in the n outer legs and produce proportional magnetomotive forces in the legs, as represented by the vector equation below, wherein a vector [$F_k$] represents the magnetomotive force components in each outer leg, and the vector [$i_{Lk}$] represents magnetizing current in each of the outer legs:

$$[F_k] = (N_p + N_s)[i_{Lk}], \text{ where } k \in \{1, 2, \ldots, n\}.$$

Representing the magnetic flux in each outer leg in an n-phase magnetic device by the a vector [$\phi_{Lk}$], the following equation can be used to relate the vector [$i_{Lk}$] to the vector [$\phi_{Lk}$]:

$$\begin{bmatrix} i_{L1} \\ i_{L2} \\ \vdots \\ i_{Ln} \end{bmatrix} = \frac{1}{N_p + N_s} \cdot \begin{bmatrix} R_L + R_C & R_C & \cdots & R_C \\ R_C & R_L + R_C & \cdots & R_C \\ \vdots & \vdots & \ddots & \vdots \\ R_C & R_C & \cdots & R_L + R_C \end{bmatrix} \cdot \begin{bmatrix} \phi_{L1} \\ \phi_{L2} \\ \vdots \\ \phi_{Ln} \end{bmatrix}.$$

From further analysis, the average value $\Phi_C$ of the magnetic flux $\phi_C$ in the common leg can be estimated using the equation:

$$\Phi_C = \frac{(N_p + N_s)}{(1 + (1-D) \cdot n_t) \cdot (R_L + n \cdot R_C)} \cdot I_o,$$

where $I_o$ is the dc current supplied to a load coupled to a power converter employing the magnetic device. The dc magnetic flux $\Phi_L$ in an outer leg is given by the equation:

$$\Phi_L = \frac{\Phi_C}{n}.$$

In equations above, the quantity $n_t$ represents the coupled winding turns ratio $N_p/N_s$, and n is the number of active phases.

Figure 14:
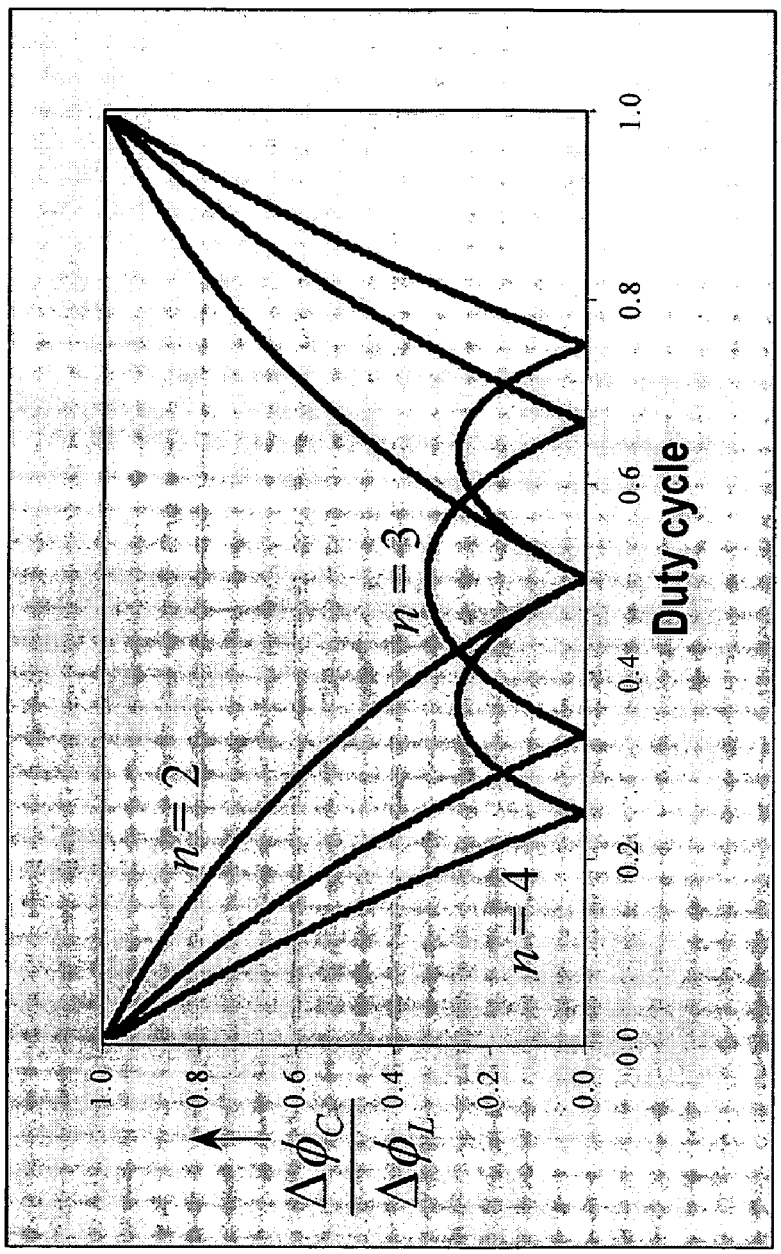
FIG. 14 illustrates a graphical representation demonstrating ripple cancellation effects for a power converter constructed according to the principles of the present invention.

Turning now to FIG. 14, illustrated is a graphical representation demonstrating ripple cancellation effects for a power converter constructed according to the principles of the present invention. More specifically, the graphical representation provides an exemplary ratio of a peak-to-peak change in magnetic flux in a common leg accommodating a common magnetic return path of a magnetic device (e.g., a tapped inductor embodied in a matrix integrated magnetic device) to a peak-to-peak change in magnetic flux in an outer leg of the magnetic device in accordance with the principles of the invention. The graphical representation provides a ratio of the peak-to-peak change in magnetic flux $\Delta\phi_C$ in the common leg of the magnetic device to the peak-to-peak change in magnetic flux $\Delta\phi_L$ in one of the outer legs thereof as a function of the duty cycle D. The three cases shown in the graphical representation are for a power converter with two, three, or four active phase legs (i.e., n=2, 3, or 4). For two active phase legs (n=2), the peak-to-peak change in magnetic flux $\Delta\phi_C$ in the common leg is zero at about 50% duty cycle, whereas for three active phase legs (n=3), the peak-to-peak change in magnetic flux $\Delta\phi_C$ in the common leg is zero at about 33% duty cycle. For the case of four active phase legs (n=4), the peak-to-peak change in the magnetic flux $\Delta\phi_C$ in the common leg is zero at about 25% duty cycle, and so on.

At these zero magnetic flux change operating points, the magnetic core loss, which is substantially dependent on high-frequency magnetic flux changes therein, is substantially reduced. In particular, the magnetic core loss in the common leg is substantially zero at these preferred operating points. In addition, since the magnetic flux in the common leg is substantially constant, there is substantially no power loss due to eddy current induction in conductors in close proximity to quick varying fringing magnetic flux. This feature, in a preferred embodiment of a tapped-inductor, multi-phase buck power converter, advantageously accommodates the design of a high-efficiency power conversion device with reduced power loss in portions of the magnetic core material and in windings forming the magnetic device. Thus, a power converter has been introduced with an integrated, multi-phase, tapped-inductor, enabling the design of a modular, scalable power converter that is readily amenable to high output current implementations.

An advantageous feature of a power converter (e.g., an integrated, multi-phase tapped inductor buck power converter) as described herein is the multi-phase pulse-width modulation for inductor current interleaving, resulting in a lower switching ripple level in load current, resulting in a need for smaller output capacitance for a given output voltage ripple specification. Of course, the switch modulation scheme is not limited to the pulse-width modulation method and switch modulation schemes may be used to advantage. Another advantageous feature is higher efficiency due to multiple parallel paths for the load current, resulting in reduced conduction losses in semiconductor devices employed in the system powered by the power converter. The lower switching frequency for a given ripple specification results in reduced switching loss. The power converter can advantageously operate with a higher duty cycle D, which provides improved control bandwidth due to the increase in ripple frequency over the switching frequency by a factor equal to number of interleaving phases. The higher power density can also be advantageously achieved due to smaller magnetic devices and lower output capacitance.

Matrix integrated magnetics is a technique to develop cellular, scalable magnetics assemblies that integrate multiple transformers and/or inductors in a single magnetic core. A core structure (which may advantageously employ planar windings) used in an integrated n-phase tapped-inductor buck power converter consists of multiple winding legs equal to the number of active phase legs, and a shared, air-gapped common leg accommodating a common magnetic flux return path, preferably including a distributed air gap, which may comprise material with different permeability, etc. A top plate may serve as a portion of the magnetic flux return path, or the common magnetic flux return path may be returned through the air. Some of the advantages of a core structure for a matrix integrated magnetic device over a discrete implementation include a low profile due to large common leg cross sectional area, shorter air gap, and improved window utilization for the windings. Another advantage of the core structure is the multi-phase pulse width modulation, resulting in interleaving of winding leg magnetic fluxes in a common leg, leading to lower or substantially zero ripple in the air gap flux. The core structure also provides a more uniform magnetic flux distribution and lower core losses.

It is understood by those skilled in the art that a single or multiple turn center-leg winding may be used with an integrated n-phase tapped-inductor buck power converter to improve filtering, among other advantages. Power topologies employing a center leg winding are described in several of the publications, patents, and patent applications listed herein. It is further understood by those skilled in the art that an integrated n-phase tapped-inductor buck power converter may include any number of phases, and is not limited to a particular number of phases illustrated and described herein.

For a better understanding of power electronics, see *Principles of Power Electronics*, by J. G. Kassakian, M. F. Schlecht and G. C. Verghese, Addison-Wesley (1991). For other references describing applicable topologies or related applications see U.S. Pat. No. 6,549,436, entitled *Integrated Magnetic Converter Circuit and Method with Improved Filtering*, to J. Sun, issued Apr. 15, 2003, U.S. Pat. No. 6,775,159, entitled *Switching Power Converter Circuits Providing Main and Auxiliary Output Voltages*," to K. F. Webb, et al., issued Aug. 10, 2004, U.S. Pat. No. 5,555,494, entitled *Magnetically Integrated Full Wave DC to DC Converter*, to G. Q. Morris, issued Sep. 10, 1996, and U.S. Pat. No. 6,362,986, entitled *Voltage Converter with Coupled Inductive Windings, and Associated Methods*, to A.M. Schultz, et al., issued Mar. 26, 2002, U.S. Pat. No. 6,094,038, entitled *Buck Converter With Inductive Turn Ratio Optimization*," to Lethellier, issued Jul. 25, 2000, a publication entitled *Switching Converters with Wide DC Conversion Range*, by D. Maksimovic and S. Cuk, IEEE Transaction on Power Electronics, pp. 151–157, January, 1991, a publication entitled *Design and Performance Evaluation of Multi-Channel Interleaving Quasi-Square-Wave Buck Voltage Regulator Module*, by P. Xu, X. Zhou, P. Wong, K. Yao, and F. C. Lee, HFPC, pp. 82–88, 2000, a publication entitled *Static and Dynamic Modeling of Tapped-Inductor DC-to-DC Converter*, by M. Rico, J. Uceda, J. Sebastian, and F. Aldana, IEEE PESC, pp. 281–288, 1987, a publication entitled *Transformerless DC-to-DC Converters with Large Conversion Ratio*, by R. D. Middlebrook, IEEE Power Electronics Transactions, pp. 484–488, 1988, a publication entitled *Comparison of Three Topology Candidates for 12V VRM*, by Jia Wei, Peng Xu, Ho-Pu Wu, Fred C. Lee, Kaiwei Yao, and Mao Ye, IEEE APEC, pp. 245–251, 2001, and a publication entitled *Introduction to the Tapped Buck Converter*, by Ron Lenk, HFPC 2000 Proceedings, pp. 155–166, 2000, all of which are incorporated herein by reference. For related applications, see U.S. patent application Ser. No. 11/349,637, entitled *Power Converter Employing Integrated Magnetics with a Current Multiplier Rectifier and Method of Operating the Same*, to Chandrasekaran, et al. filed Feb. 8, 2006, and U.S. patent application Ser. No. 11/361,914 entitled *Control Circuit for a Depletion Mode Switch and Method of Operating the Same*, to Rozman, filed Feb. 23, 2006, which are also incorporated herein by reference.

Those skilled in the art should understand that the previously described embodiments of the power converter (e.g., as a multi-phase, tapped inductor buck power converter) constructed with a matrix integrated magnetics device, and related methods of forming and operating the same, are submitted for illustrative purposes only. In addition, other embodiments capable of providing the advantages as described above are well within the broad scope of the present invention. While the circuit and magnetic designs have been described as providing advantages in the environment of a power converter and, more generally, a power supply, other applications therefor are well within the broad scope of the present invention.

Also, although the present invention and its advantages have been described in detail, it should be understood that various changes, substitutions and alterations can be made herein without departing from the spirit and scope of the invention as defined by the appended claims. For example, many of the topology, circuit and magnetic designs discussed above can be implemented in different methodologies and replaced by other topology, circuit and magnetic designs, or a combination thereof, to advantageously form power converters providing reduced output voltage ripple, improved efficiency, reduced size, and reduced costs as described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power converter, comprising:
    a first tapped inductor including a tapped winding having a first section and a second section with a tap therebetween;
    a second tapped inductor including a tapped winding having a first section and a second section with a tap therebetween;
    a first active phase leg including a main switch series-coupled with an input node of said power converter and said first section of said tapped winding of said first tapped inductor, said first active phase leg also including an auxiliary switch interposed between said second section of said tapped winding of said first tapped inductor and an output node of said power converter; and
    a second active phase leg including a main switch series-coupled with an input node of said power converter and said first section of said tapped winding of said second tapped inductor, said second active phase leg also including an auxiliary switch interposed between said second section of said tapped winding of said second tapped inductor and an output node of said power converter.

2. The power converter as recited in claim 1 wherein said auxiliary switch of at least one of said first and second active phase legs is selected from the group consisting of:
    a metal-oxide semiconductor field-effect transistor; and
    a diode.

3. The power converter as recited in claim 1 wherein said auxiliary switch of at least one of said first and second active phase legs operates as a synchronous rectifier for said power converter.

4. The power converter as recited in claim 1 wherein said main switch of said first active phase leg is interposed between said input node of said power converter and said first section of said tapped winding of said first tapped inductor.

5. The power converter as recited in claim 1 wherein said main and auxiliary switches of at least one of said first and second active phase legs conduct in a substantially complementary manner.

6. The power converter as recited in claim 1 wherein at least one of said first and second tapped inductors is a matrix integrated magnetic device.

7. The power converter as recited in claim 1 wherein at least one of said first and second tapped inductors includes a magnetic core having a common leg with an air gap and at least one outer leg.

8. The power converter as recited in claim 1 wherein said first tapped inductor includes a magnetic core having a common leg and at least one outer leg, said first and second winding sections of said tapped winding thereof being coupled pairs about at least one of said outer legs.

9. The power converter as recited in claim 1 wherein a reluctance of a magnetic path coupling said first and second winding sections of said tapped winding of said first tapped inductor is less than a reluctance of a common magnetic flux return path thereof.

10. The power converter as recited in claim 1 wherein a duty cycle associated with said main and auxiliary switches of said second active phase leg is delayed from a duty cycle associated with said main and auxiliary switches of said first active phase leg substantially inversely proportional to a number of active phase legs of said power converter.

11. A method of operating a power converter having an input node coupled to a source of electrical power and an output node, comprising:
    providing a first tapped inductor including a tapped winding having a first section and a second section with a tap therebetween;
    providing a second tapped inductor including a tapped winding having a first section and a second section with a tap therebetween;
    controlling a main switch of said first active phase leg to induce an input current from said source of electrical power in said tapped winding of said first active phase leg;
    operating an auxiliary switch of said first active phase leg to provide an output current to said output node via said second section of said tapped winding of said first tapped inductor;
    controlling a main switch of said second active phase leg to induce an input current from said source of electrical power in said tapped winding of said second active phase leg; and
    operating an auxiliary switch of said second active phase leg to provide an output current to said output node via said second section of said tapped winding of said second tapped inductor.

12. The method as recited in claim 11 wherein said auxiliary switch of at least one of said first and second active phase legs is selected from the group consisting of:
    a metal-oxide semiconductor field-effect transistor; and
    a diode.

13. The method as recited in claim 11 wherein said auxiliary switch of at least one of said first and second active phase legs operates as a synchronous rectifier for said power converter.

14. The method as recited in claim 11 wherein said main switch of said first active phase leg is interposed between said input node of said power converter and said first section of said tapped winding of said first tapped inductor.

15. The method as recited in claim 11 wherein said main and auxiliary switches of at least one of said first and second active phase legs conduct in a substantially complementary manner.

16. The method as recited in claim 11 wherein at least one of said first and second tapped inductors is a matrix integrated magnetic device.

17. The method as recited in claim 11 wherein at least one of said first and second tapped inductors includes a magnetic core having a common leg with an air gap and at least one outer leg.

18. The method as recited in claim 11 wherein said first tapped inductor includes a magnetic core having a common leg and at least one outer leg, said first and second winding sections of said tapped winding thereof being coupled pairs about at least one of said outer legs.

19. The method as recited in claim 11 wherein a reluctance of a magnetic path coupling said first and second winding sections of said tapped winding of said first tapped inductor is less than a reluctance of a common magnetic flux return path thereof.

20. The method as recited in claim 11 wherein a duty cycle associated with said main and auxiliary switches of said second active phase leg is delayed from a duty cycle associated with said main and auxiliary switches of said first active phase leg substantially inversely proportional to a number of active phase legs of said power converter.

* * * * *